US 6,574,902 B1

(12) United States Patent
Conger

(10) Patent No.: US 6,574,902 B1
(45) Date of Patent: *Jun. 10, 2003

(54) APPARATUS FOR SIMULATING THE MOVEMENT OF AN ANIMAL

(75) Inventor: Randy L. Conger, 993 Elkhorn Tavern Rd., Eddyville, KY (US) 42038

(73) Assignee: Randy L. Conger, Eddyville, KY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/419,324

(22) Filed: Oct. 15, 1999

(51) Int. Cl.[7] .............................................. A01M 31/06
(52) U.S. Cl. .................................................. 43/2; 43/3
(58) Field of Search ........................................... 43/2, 3

(56) References Cited

U.S. PATENT DOCUMENTS

| | | | | |
|---|---|---|---|---|
| 740,293 A | * | 9/1903 | Loeble | 43/3 |
| 2,028,849 A | * | 1/1936 | Shay | 43/3 |
| 2,174,211 A | * | 9/1939 | Hutaff | 43/3 |
| 2,547,286 A | * | 4/1951 | Sabin | 43/3 |
| 2,624,144 A | * | 1/1953 | Beverman | 43/3 |
| 2,726,469 A | * | 12/1955 | Becker | 43/3 |
| 2,793,456 A | * | 5/1957 | Argo | 43/3 |
| 4,128,958 A | | 12/1978 | Snow | |
| 4,304,194 A | * | 12/1981 | Boykin, II et al. | 119/51.04 |
| 4,535,560 A | * | 8/1985 | O'Neil | 43/3 |
| 4,599,819 A | | 7/1986 | Voges, Jr. et al. | |
| 4,910,905 A | * | 3/1990 | Girdley et al. | 43/3 |
| 4,965,953 A | | 10/1990 | McKinney | |
| 5,168,649 A | | 12/1992 | Wright | |
| 5,289,654 A | | 3/1994 | Denny et al. | |
| 5,459,958 A | | 10/1995 | Reinke | |
| 5,632,110 A | | 5/1997 | Roy | |
| 5,791,081 A | | 8/1998 | Turner et al. | |
| 5,832,649 A | | 11/1998 | Kilgore | |
| 5,974,720 A | * | 11/1999 | Bowling | 43/3 |
| 6,079,140 A | * | 6/2000 | Brock, IV | 43/3 |
| 6,138,396 A | * | 10/2000 | Capps | 43/3 |

* cited by examiner

Primary Examiner—Kurt Rowan
(74) Attorney, Agent, or Firm—King & Schickli, PLLC

(57) ABSTRACT

A decoy apparatus provides simulated walking movement of an animal along a path defined by a track. A carrier on the track supports the decoy and a motive device moves the carrier back and forth. A reversing mechanism in the form of a pulley on the carrier causes the decoy to face in the proper direction. The motive device includes first and second lines extending along the track. A spring driven spool tensions and provides the differential pulling force for the first line; the second line being similarly manually operated. A decoy attachment post includes a coil spring for creating a bobbing action. The track is an I-beam that hinges in the middle for transport. In an alternative embodiment, an electronic remote control circuit is provided. A related method of operating a decoy for walking movement in response to a motive force and reversing action is included.

11 Claims, 4 Drawing Sheets

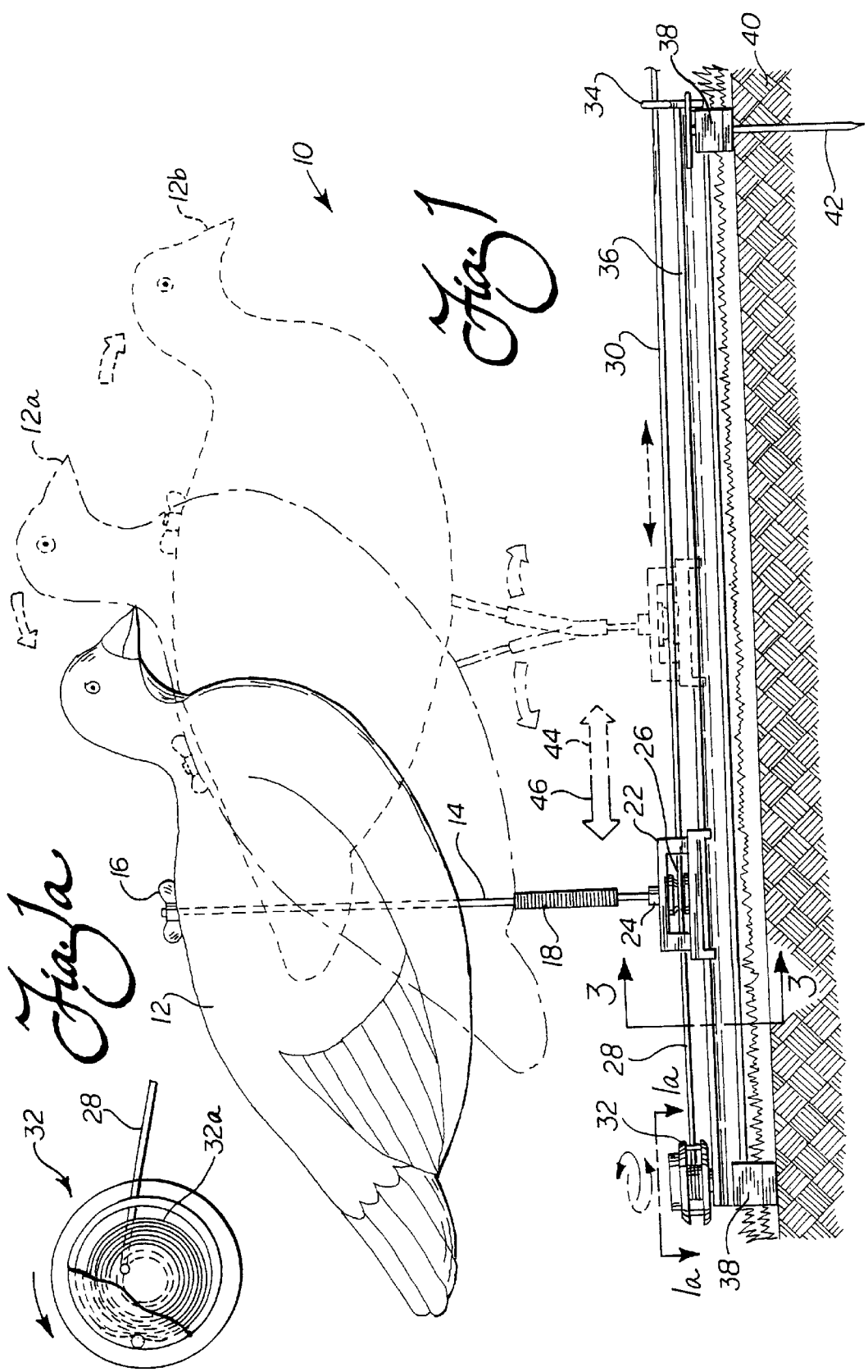

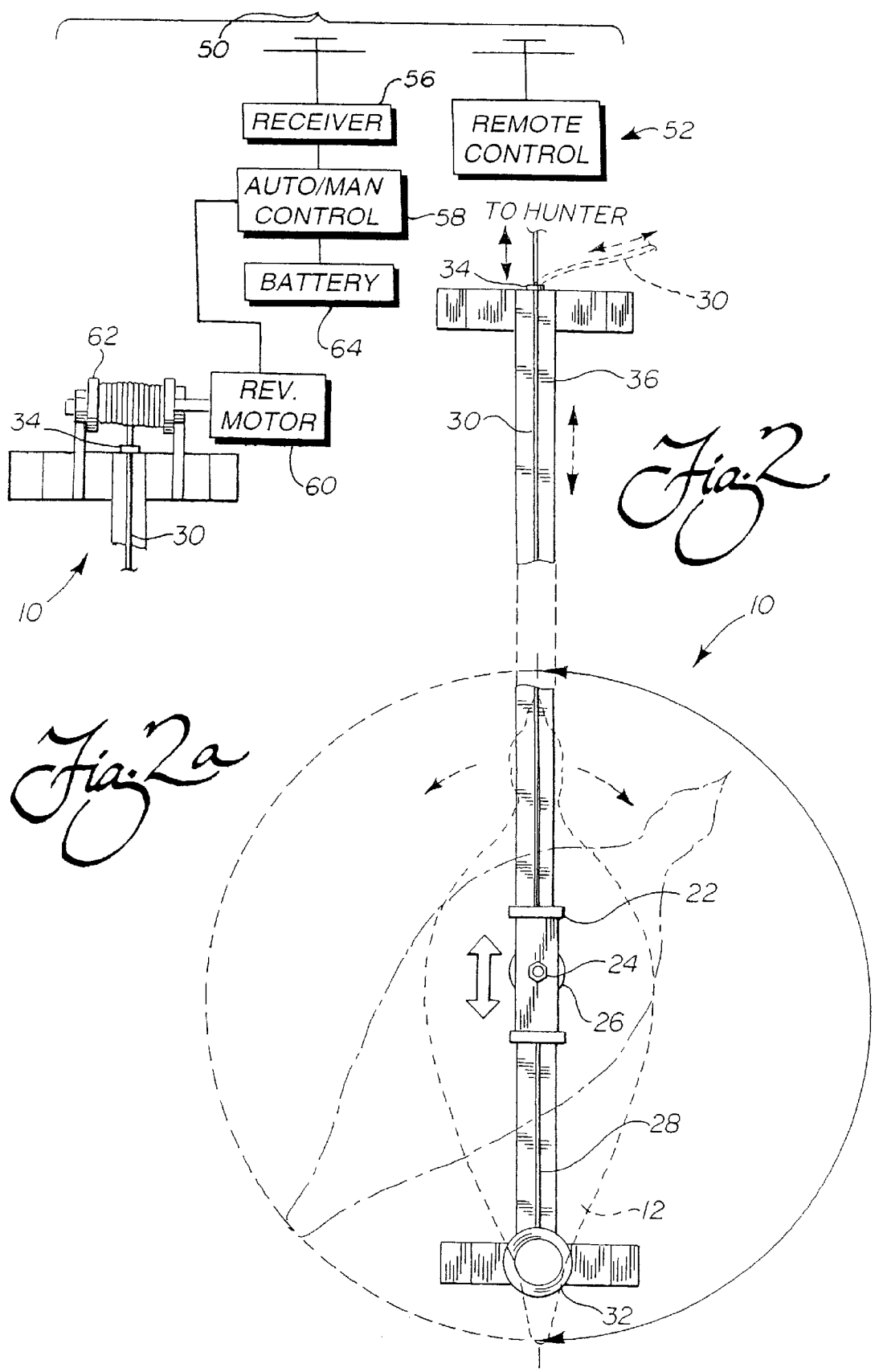

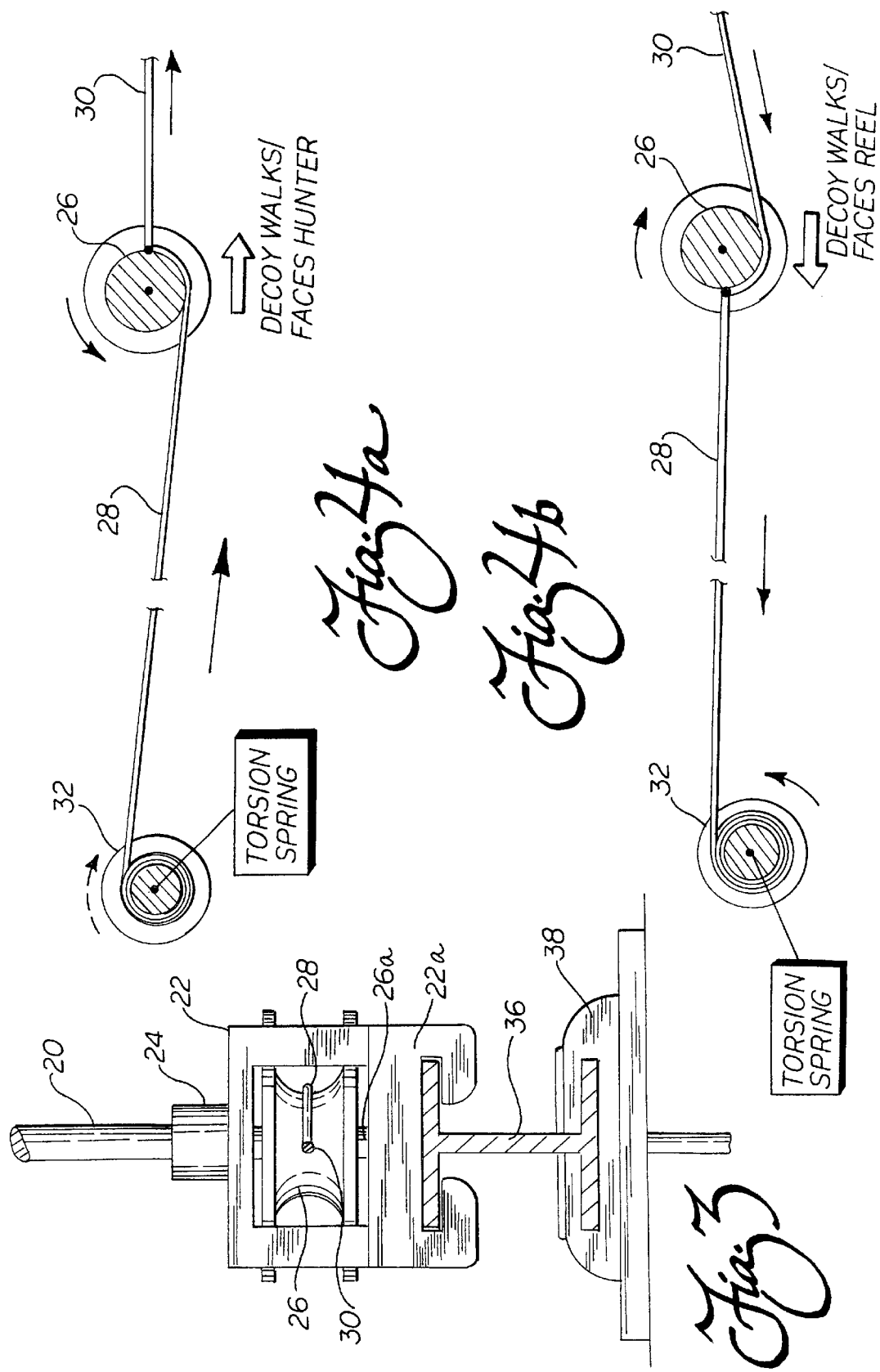

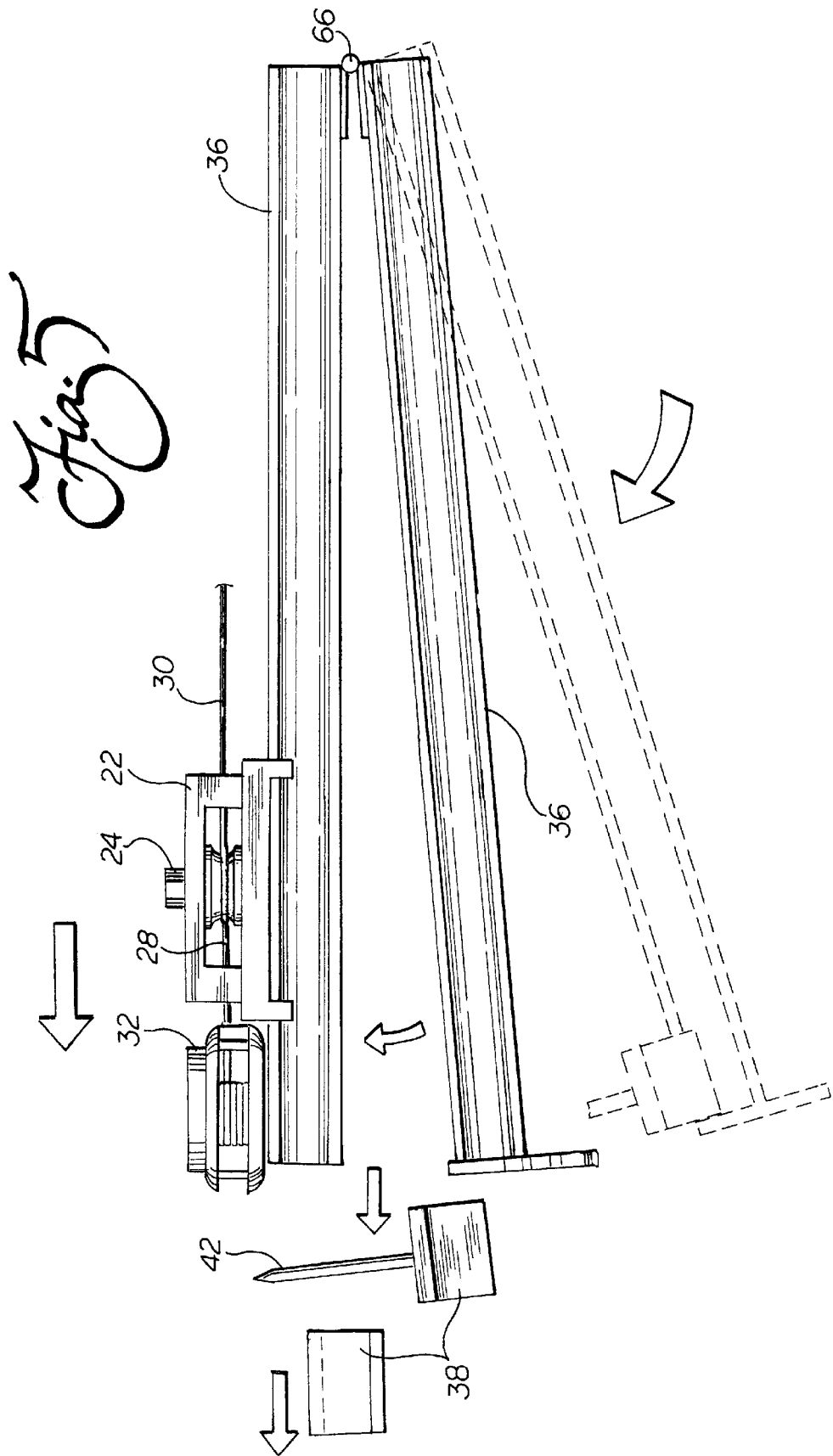

US 6,574,902 B1

APPARATUS FOR SIMULATING THE MOVEMENT OF AN ANIMAL

TECHNICAL FIELD

The present invention relates generally to decoys for attracting a predetermined species of animals, and, more particularly, to decoys with moveable parts to simulate life-like movements of animals such as game birds, mammals and the like.

BACKGROUND OF THE INVENTION

Decoys having the external appearance simulating a particular type of species of bird or mammal have long been used as a means of attracting such animals. The earliest and most common to decoys are of a type which merely simulate the appearance of an animal. More recent decoys have been developed which, in some manner, also simulate the movement of an animal.

A typical prior art decoy is directed to water fowl, as illustrated in U.S. Pat. No. 4,599,819 to Voges et al. Typical bird decoys are seen in U.S. Pat. No. 4,965,953 to McKinney, U.S. Pat. No. 5,168,649 to Wright, U.S. Pat. No. 5,289,654 to Denny et al., and U.S. Pat. No. 5,459,958 to Reinke. A typical large mammal decoy is seen in U.S. Pat. No. 5,632,110 to Roy.

Each of these decoys have several advantages in simulating the movement of a particular animal species. The decoys use a variety of devices to generate the movement. Of course, the object of the simulated movement is to fool the game animal to be attracted into believing that the decoy is a real animal. Most of these prior art movable decoys move in a manner to simulate feeding or some other simple motion. However, the present decoys are unable, in a simple and straight forward manner, to fully simulate the realistic movement of an animal, such as by including movement about within a specified area.

Thus, there is a need for a decoy apparatus, and related method of attracting an animal, which realistically and more completely simulates the movement of a particular animal. Such a decoy would simulate a walking motion, and would not only move back and forth, but would also turn at the end of each line of movement and face in the direction of movement for greater realism. Ideally, the decoy would also do such a movement with an apparatus which is easy to transport and set up in the wild. Also, such a decoy would be simple in design, able to be operated easily, would be reliable even in poor weather conditions and is virtually maintenance-free.

SUMMARY OF THE INVENTION

Therefore, it is an object of the present invention to provide a decoy apparatus and related method that realistically simulates a walking movement of a particular animal.

It is another object of the present invention that such a decoy would not only move back and forth, as if walking, but would also turn at the end of each line of movement and face in the direction of movement.

It is a further object of the present invention that such a decoy would do such a simulated walking movement with an apparatus which is simple in design for ease of operation, and is easy to transport and set up in the wild.

It is yet another object of the present invention to provide such a decoy that would be able to be reliably operated in poor weather conditions and is virtually maintenance-free.

Additional objects, advantages, and other novel features of the invention will be set forth in part in the description that follows and in part will become apparent to those skilled in the art upon examination of the following or may be learned with practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an apparatus for simulating realistic walking movement of an animal species along a path is provided. The apparatus of the invention disclosed can be used with variety of decoys, in a variety of terrains, and under a variety of environmental conditions. In its broadest aspect, the decoy is mounted for the walking movement along a track in response to a motive device. To enhance the realism, a reversing mechanism is provided so that at each end of the path, the decoy turns to head in the proper direction, and then walks back in the opposite direction.

In accordance with the preferred embodiment, a turkey or other game animal decoy thus moves in response to the motive device as if walking back and forth along a stationary track mounted on the ground. The distance between a first end and a second end of the track can be of any particular length to simulate the movement of the particular animal along a path. The motive device in a preferred embodiment includes a spool for feeding out a first end of a first line under spring tension. The spool is attached to the first end of said stationary track. The preferred motive device also includes an oppositely directed second line and a carrier associated with the track in such a way that the carrier moves in response to pulling on the lines substantially from the first end of the track to a second end of the track, and vice versa.

The reversing mechanism comprises in its preferred form a rotating support for the decoy associated with the moving carrier with its axis generally oriented perpendicular to the track. The rotating support receives the first end of the first line and the first end of the second line, such that when there is no tension on the second line, the rotating support is rotated to be generally aligned in a first direction toward the first end of the track. Conversely, when there is tension on the second line, the rotating support is rotated to be generally aligned in a second direction toward the second end of the track, substantially 180 degrees from the first direction. An attachment post extends upwardly from a socket on the rotating support for receiving the decoy so as to position it at a natural height above the ground for the particular animal.

In the operation of the apparatus and in the practice of the preferred method of the present invention, when the operator applies tension to the free end of the second line, the rotating support rotates to face the decoy in the second direction. Next, an increased differential pulling force is applied to overcome the spring tension of the spool applied to the first line. The carrier, the rotating support, and the attachment post then move along the track in the second direction toward the second end of the track until the pulling force is relaxed, stopping the decoy. The tension is maintained in order to pause the decoy. When the operator of the apparatus further relaxes the tension from the second line, the rotating support rotates to face the decoy in the first direction due to the spring tension on the spool. The carrier then proceeds to move along the track in the first direction toward the first end as a sufficient differential pulling force is applied in that direction by the spool. Thus, upon repetition of these basic steps, the decoy mounted on the carrier turns and moves back and forth, and pauses occasionally, in such a manner as to realistically simulate the movement of a real animal. As is apparent, the decoy can be made in the form of any game animal or the like and can be used on substantially any terrain and under a variety of environmental conditions.

In accordance with other aspects of the preferred embodiment, the spool of the motive device holds a captive end of the first line. It is tensioned and driven by a rotary torsion spring that exhibits a substantially constant torque over its range of operation. The spring maintains the proper balancing tension as the free end of the second line is pulled by the operator with the proper differential pulling force in the second direction: (1) to move the decoy; (2) to pause the decoy; and/or (3) to apply the requisite pulling force to reverse and pull the decoy back in the first direction.

A rotating support in the form of a pulley is a part of the reversing mechanism. The first ends of the lines are attached to the same location on the pulley. This arrangement causes the decoy to rotate 180 degrees each time the pulling force is switched. The decoy reverses its direction just as if walking. The first and second lines alternately wrap approximately half way around the pulley in opposite directions to generate this reversing action. The attachment post on the pulley includes a coil spring to allow bobbing up and down of the decoy as it moves along the path and turns. The decoy's life-like motion is thereby enhanced.

A guide member adjacent the second end of the track supports an eyelet for the second line. The operator can be positioned in a blind off to the side and still operate the decoy apparatus of the present invention. The motive device of the preferred decoy apparatus also includes an I-beam as the track. The carrier is a slide block having a transverse slot slideably embracing the upper cross piece of the I-beam. The pulley for reversing the decoy is rotatably mounted on a rotary shaft journaled in the carrier. An attachment post is supported in a socket on the shaft as it passes through the top section of the slide block. The lower cross piece of the I-beam is held secure adjacent the ground at both ends. Mounting shoes having T-slots are locked by a friction fit on the lower cross piece. A stake on the shoe adjacent the second end prevents inadvertent displacement as the second line is pulled by the operator.

A further preferred embodiment of the motive device of the present invention provides for a remote control mechanism including a motorized winch for taking up and releasing the second line in response to control commands or input from the operator of the apparatus. It is preferred by some in that more freedom is allowed for the operator to move from one blind to another and still maintain control. This mechanism comprises a hand-held transmitter for selection of the commands by the operator and for transmitting the commands to a receiver. The commands available to operate the motor and winch include: (1) to take up or pull the second line to move the decoy toward the second end; (2) to stop the take up or pulling force, but maintain equilibrium tension to stop/pause the decoy; and (3) to reverse the motor and pay out the second line from the winch to allow turning of the decoy and movement back toward the first end of the track under the pulling force of the spool. The transmitter/receiver may use any suitable energy beam, such as infrared. A solid state controller for either automatic or manual operation can be included.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1 is a side view showing a preferred embodiment of a decoy apparatus for simulating, as viewed from a distance, the movement of an animal along a particular path according to the present invention;

FIG. 1a is a top view of a spool for tensioning and pulling the first line of the apparatus shown in FIG. 1, and taken along section line 1a—1a;

FIG. 2 is a top view of the same embodiment of the decoy apparatus shown in FIG. 1, and illustrating the walking and reversing movement of the animal in response to the tensioning and pulling action of the first and second lines according to the present invention;

FIG. 2a is a schematic drawing of an alternative remote control mechanism for the decoy apparatus according to the present invention;

FIG. 3 is a close up view of the reversing mechanism of the apparatus according to the present invention as shown in FIG. 1 and taken along section line 3—3 of FIG. 1;

FIGS. 4a–4b are schematic views of parts of the motive device and reversing mechanism of the apparatus according to the present invention, with FIG. 4a showing the direction of movement of the decoy toward and facing the operator, and FIG. 4b showing the movement and facing of the decoy away from the operator; and FIG. 5 is a side view of the decoy apparatus illustrating partial disassembly and folding for ease of carrying to and from the location in the wild for use.

Reference will now be made in detail to the present preferred embodiment of the invention, an example of which is illustrated in the accompanying drawings.

DETAILED DESCRIPTION OF THE PREFERRED EMBODIMENT

Reference is now made to FIG. 1 illustrating the decoy apparatus 10 for simulating, when viewed at a distance, the movement of an animal species along a particular path. A decoy 12 is secured to an attachment post 14 by a wing nut 16. A game bird, such as a turkey hen, is shown as the illustrated decoy 12, but any simulation of any animal that is of interest to act as a decoy 12, may be used with this apparatus 10. An attachment post 14 includes a tightly wound coil spring 18 that allows bobbing or tilting action; the lower end being releasably attached to a carrier 22 by a socket 24.

The carrier 22 includes a pulley 26 which is integral with and thus rotates on a shaft 26a (see FIG. 3), and supports the socket 24. A first line 28 and a second line 30 are preferably strings attached to the pulley 26 at a common location by respective first ends. The first line or string 28 passes from the pulley 26, out of the carrier 22, and is attached at a captive end to a take-up reel 32. The second line 30 passes from the pulley 26, out of the carrier 22, to a guide member 34 having an eyelet. The free end of the second line is held and manipulated by the operator of the decoy apparatus 10.

The take-up reel 32 and the guide member 34 are fixed to a stationary, continuous, and substantially inflexible track 36 at respective, first and second ends. The carrier 22 is slidably attached to the stationary, continuous, and substantially inflexible track 36 through a slot in such a manner that the carrier 22 can move from the first end of the track 36 to the second end of the track 36, and vice versa. The track 36 is preferably an I-beam and has mounting shoes 38 for supporting and stabilizing the apparatus 10 on ground 40. At least one stake 42 integral with the mounting shoe 38 adjacent the second end is driven into the ground 40 to stabilize the apparatus 10.

To activate the motive device of the apparatus 10, the operator pulls with a differential force on the second line 30 in the direction of the broken action arrow 44 causing the carrier 22 with the pulley 26 and the attachment post 14 supporting the decoy 12 to move toward the second end of the track 36. As the carrier 22 starts to slide forward, the decoy 12 reverses direction to head forward, if necessary (see FIG. 2). The angled, dash-dot line shows the position as it is reversing to the straight, dash line position. Due to the natural sliding friction of the mounting slot of the carrier 22 on the upper cross piece of the I-beam track 36 (see FIG. 3), the spring 18 flexes in such a way that the decoy 12 simulates the bobbing of an animal as it walks. That is, the decoy 12 pivots up and down between positions 12a and 12b as a result of the spring movement of the post 14 (see FIG. 1). The bobbing action can be increased by sharp tugs on the second line 30 to vary the differential pulling force in either direction.

When the operator of the apparatus 10 relaxes the pulling force, but retains tension on the second line 30, the spool 32 draws the first line 28 back in the first direction toward the first end as driven by the differential pulling force of the spool 32. The pulley 26, the carrier 22 with the attachment post 14 in the socket 24 and the decoy 12 moves in the direction of the solid action arrow 46 (see FIG. 1). Just before this movement starts, the pulley 26 on the carrier 22 rotates 180 degrees to face the decoy 12 in the first direction. This sequence completes one full cycle of simulating the movement of the animal in walking along the path defined by the track 36.

FIGS. 2, 4a and 4b show a top or plan view of part of the motive device, and illustrate in further detail how the spool 32, the first and second lines 28, 30 and the pulley 26 cooperate to simulate the walking action. The differential pulling force on the second line 30 rotates the pulley 26 (see arrows in FIG. 4a) and the decoy 12 moves along the track 36 in the second direction. The tension on the spool 32 keeps the first line 28 taut. When the operator no longer pulls on the second line 30, but tension is maintained in the line 30, the pulley 26 rotates back 180 degrees in response to the pulling force of the spring 32a, and therefore the carrier 22 and the decoy 12 move in the first direction (see arrows in FIG. 4b). The presence of the guide member 34 and the second end of the track 36 (see FIG. 2) allows the operator to set up the apparatus 10 at an angle and still be able to control the apparatus 10 by the tensioning and/or pulling on the second line 30 (see dash line illustration).

FIG. 3 shows an enlarged cross-sectional view of the carrier 22 including a slide block 22a with the slot embracing the upper cross piece of the I-beam track 36. The pulley 26 is rigidly attached to the shaft 26a supporting the socket 24. The first line 28 and the second line 30 are attached to the pulley 26 at the same place so that the rotation is limited to 180 degrees back and forth. The carrier 22 slides relatively freely on the track 36, but a lubricant can be used to vary the motion as desired.

FIG. 2a is a schematic drawing of an electronic remote control mechanism 50 for the decoy apparatus 10 that can be substituted for the differential pulling force and tensioning provided manually. A hand-held transmitter/selector 52 provides energy beam signals to a receiver 56 to operate a solid state automatic/manual controller 58 for the reversible motor 60. A winch 62 winds the second line 30, as directed through the eyelet on the guide member 34 in response to the rotary motion of the motor 60. A battery 64 provides power to the mechanism 50 through the controller 58. In operation, the operator makes an input through the transmitter 52. In the manual mode the motor 60 can drive the winch 62 to take in or pull the line 30 and move the decoy 12 in the second direction. An input to pay out the line 30 and walk the decoy in first direction reverses the motor, allowing the pulling force of the spring 32a to come into play. In each instance, the first part of the movement is to rotate the pulley 26 to face the decoy 12 in the proper direction. When automatic operation is signaled from the transmitter 52, built in software in the controller takes over to move the decoy in a pre-programmed pattern based on the previously observed and documented movements of the particular animal.

FIG. 5 illustrates the manner in which the decoy apparatus 10 is folded for transport to and from the point of use, or for storage. The track 36 is made in two sections connected at a hinge 66 that allows folding in half. In preparation for the folding of the apparatus 10, the mounting feet 38 are removed from the track 36 by sliding off the ends, as shown. The decoy 12 and the attachment post 14 are removed by lifting from the socket 24 and then separated. The carrier 22 is allowed to be shifted by the pulling force of the spool 32 so as to abut it adjacent the first end of the track 36. These parts of the decoy apparatus 10 can then be conveniently placed together in a duffle bag or the like for carrying.

In summary, it can be realized that the objectives, results and advantages sought have been obtained. A decoy apparatus 10 and related method to more fully simulate the natural movement of an animal, including walking, is provided in a simple and easy to operate form. Furthermore, the various parts can be partially disassembled and folded for carrying. Under virtually all weather conditions, reliable operation is assured, and the entire apparatus is virtually maintenance-free.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A decoy apparatus for simulating back and forth walking movement of an animal along a path, comprising:

a track adjacent the ground defining said path;

a decoy supported on a carrier, said carrier being supported for movement along said track;

a motive device for moving the carrier and the decoy including a first line to provide tensioning and a differential pulling force to the carrier in a first direction, and a second line to provide tensioning and a differential pulling force to the carrier in a second direction, said lines extending along said track and having first ends connected to said carrier, and a reversing mechanism on said carrier to match the facing direction to the walking of the decoy, comprising a pulley rotatably supported on a substantially vertical shaft on said carrier, said decoy carried on said shaft, with the first ends of said first and second lines being connected to the same location on said pulley, whereby the decoy rotates 180 degrees in response to each differential pulling force to face the decoy in the proper direction for walking.

2. The decoy apparatus of claim 1, wherein the first line is on a spool, the captive end of said line being attached thereto and a spring is connected to said spool to provide said tension/pulling force in the first direction.

3. The decoy apparatus of claim 2, wherein the second line has a free end for an operator of the decoy apparatus to provide manual tensioning and differential pulling force in the second direction.

4. The decoy apparatus of claim 1, whereby the decoy rotates 180 degrees in response to each differential pulling force to face the decoy in the proper direction for walking.

5. The decoy apparatus of claim 1, wherein said shaft includes a socket at its upper end, and an attachment post for supporting said decoy with a detachable fit in said socket.

6. The decoy apparatus of claim 1, wherein is provided a coil spring forming a portion of said substantially vertical shaft to provide bobbing action of said decoy in response to movement of the carrier along said track.

7. The decoy apparatus of claim 1, wherein said track is provided in at least two sections with a hinge to allow folding for ease of transport.

8. The decoy apparatus of claim 7, wherein said track is in the form of an I-beam, said carrier including a slide block having a slot embracing the upper cross piece to allow the back and forth movement.

9. The decoy apparatus of claim 8, wherein is provided at least a pair of mounting shoes for said track, and a T-slot having a friction fit on each shoe for mounting adjacent the ends of the track on the lower cross piece.

10. The decoy apparatus of claim 1, wherein said motive device includes a winch for said second line, a reversible motor for driving said winch to tension and take up or pay out said line, and a controller for operating said motor.

11. The decoy apparatus of claim 10, wherein is provided a remote transmitter and a receiver connected to said controller for receiving commands in the form of energy beam signals to operate the motor and the carrier.

* * * * *